Oct. 14, 1941.     R. H. TALBOT     2,259,009
ANTIABRASION COATING FOR PHOTOGRAPHIC FILM
Filed Nov. 23, 1938     2 Sheets-Sheet 1
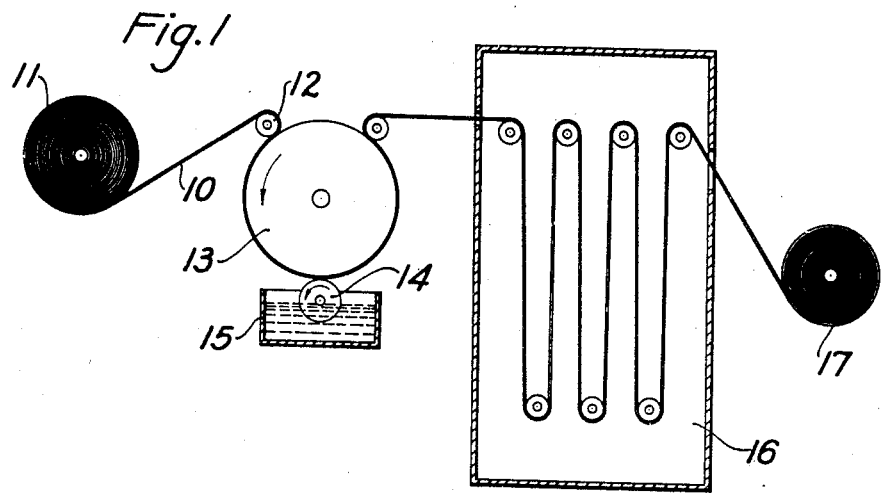
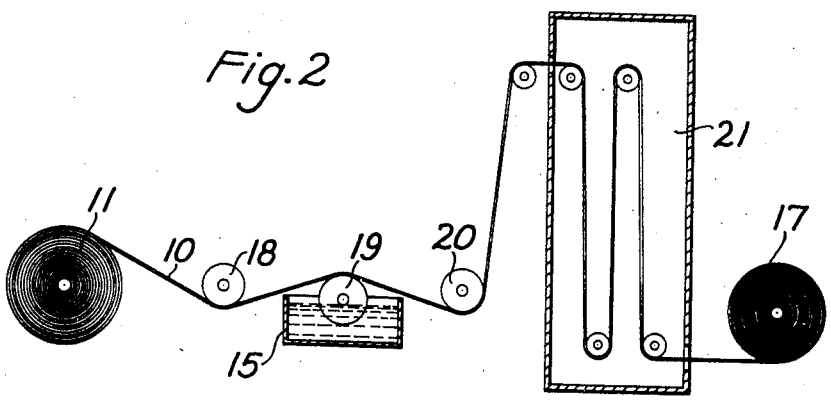
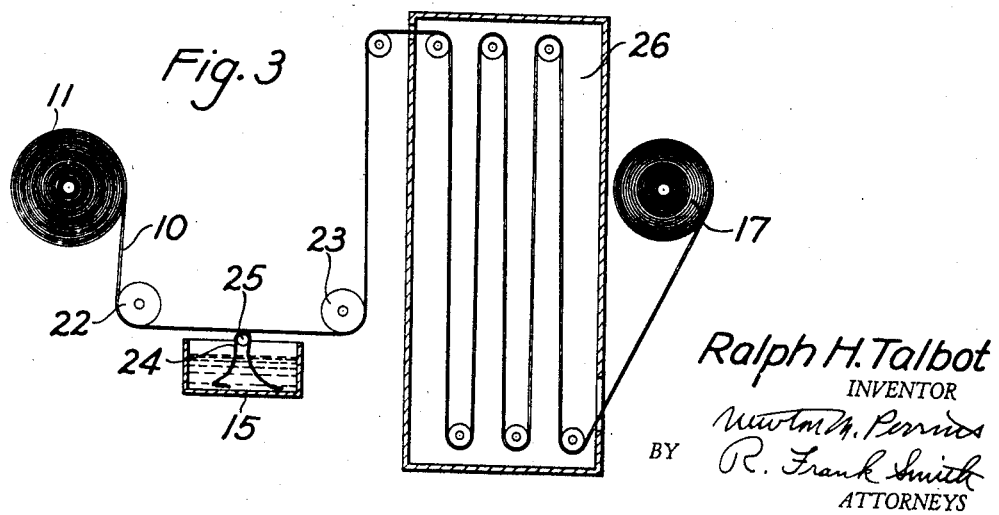
Ralph H. Talbot
INVENTOR
BY
ATTORNEYS Oct. 14, 1941.                R. H. TALBOT                2,259,009
                ANTIABRASION COATING FOR PHOTOGRAPHIC FILM
                    Filed Nov. 23, 1938        2 Sheets-Sheet 2
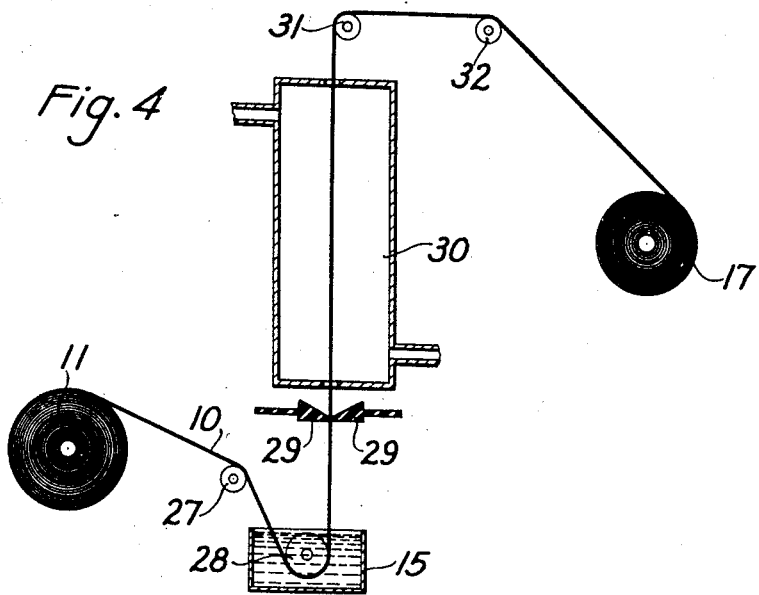
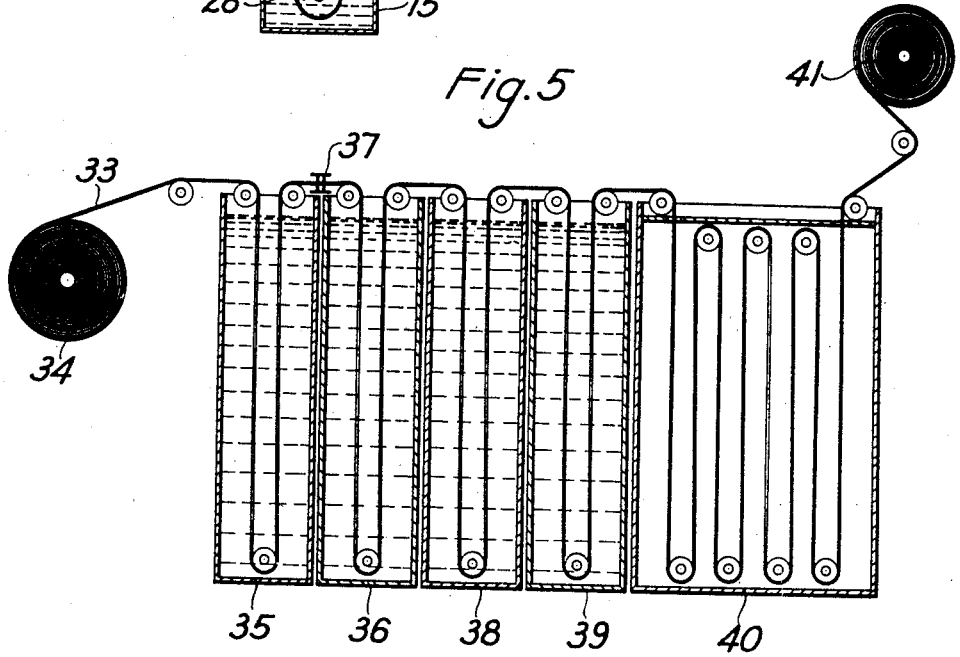
Ralph H. Talbot
INVENTOR
BY  Newton M. Perrins
    R. Frank Smith
    ATTORNEYS Patented Oct. 14, 1941

2,259,009

UNITED STATES PATENT OFFICE 2,259,009

ANTIABRASION COATING FOR PHOTOGRAPHIC FILM

Ralph H. Talbot, Rochester, N. Y., assignor to Eastman Kodak Company, Rochester, N. Y., a corporation of New Jersey Application November 23, 1938, Serial No. 242,031

3 Claims. (Cl. 88—19.5)

This invention relates to a method of preventing abrasion of photographic film, particularly motion picture film, and to film coated so that abrasion is prevented.

There have been many attempts in the past to treat motion picture film either before or after processing in such a way as to make it less susceptible to scratching due to projection and handling. It is a well-known fact that since the advent of sound film, it is necessary to discard prints due to scratches in the sound track, which either distorts the sound or due to heavy ground noise make these films unusable, long before the normal life of the film has been reached.

Most of the methods heretofore have attempted to improve the scratch resistance by the applying to the film of various materials which would be less susceptible to scratching than is either the emulsion layer or the support layer of ordinary film. For instance, waxes in various forms have been applied. Whereas the application of wax will produce a more slippery film which will pass through a projector gate with greater ease and will also be less susceptible to cinching, the wax coat must be buffed to produce a coating of good appearance. It is very difficult to buff this wax coating onto motion-picture film without producing scratches. Furthermore, it is too slow and costly. There have been also many attempts to apply permanent lacquer coatings onto either one side or the other of motion-picture film. The only object of these coatings can be that they will scratch less easily than the normal film surface. Although these coatings may in some cases reduce somewhat the scratching due to abrasion, no coating has ever been found which will be entirely impervious to scratches due to foreign particles or contact with some part of a projection machine. Therefore, any satisfactory method for the permanent protection of photographic film must involve the removal of the damaged coating and its replacement with a new coating. This must be accomplished without impairing the quality of the photographic film or image.

The requirements for a satisfactory scratch-proofing coating are as follows:

1. The material used must be easily soluble in a solvent or solvents from which it may be applied to the picture and sound areas of processed motion picture film to give a glossy coating of the proper thickness without any imperfections such as "orange peel," etc., which will in any way impair the projected image.

2. The solvents from which these coatings are made must have just the right "bite" into both the emulsion side and the base side of motion picture film. If the solvents do not attack the underlayer at all, the coating will "peel." This causes the coating to lift on scratching, giving in many cases a white streak which is less desirable from a projection standpoint than a scratch. If the solvents attack the underlayer too strongly, the coating will not be removable. It is necessary, therefore, to adjust the attack of the solvents so that the coating is firmly held and yet can be easily removed.

3. The solutions must be capable of even application without excess wetting or retraction around the perforations. If the solvent wets too easily, the coat will run into the perforation area and result in a ragged edged coating. If the solvents do not wet sufficiently, there will be a retraction around each perforation leaving an uncoated area which will cause the coating to fluctuate in and out of the sound track area causing distortion of the sound.

4. The solvents must be capable of rapid removal with the aid of heat.

5. The coating must not be too greatly affected by high humidity. This would cause tackiness of the film and also make it very susceptible to finger printing.

6. The coat must be easily soluble in the standard splicing solvents. Since this coat will be applied to both sides of the motion picture film, it must be soluble in the splicing solvents, as otherwise it would have to be removed from the base side before a splice could be made.

7. The coat must not be adversely affected by the cleaning treatment employed in many film exchanges.

8. The coat must be easily removable. The coat must be easily removable in either ordinary tap water or water made slightly alkaline with ammonia or sodium carbonate, etc. It is preferable that the coat be removed simply by running the film through such a bath rather than by squeegeeing, since the latter often produces scratches or abrasion marks on the swollen and softened emulsion.

It is, therefore, an object of the present invention to provide an anti-abrasion coating which meets all or a majority of the above requirements. Other objects will appear from the following description of my invention.

Materials which I have found suitable for use as protective coatings for photographic film, according to my invention, include cellulose mixed esters or ether-esters which contain a dicarboxylic acid radical, the carboxyl groups of which are linked by intervening carbon atoms and one of the carboxyl groups of which is joined to the cellulose, and water-soluble salts of these compounds. A preferred material is cellulose acetate phthalate.

In the accompanying drawings, Figs. 1, 2, 3, and 4 illustrate methods of applying a protective coating to photographic film according to my invention;

Fig. 5 illustrates a method of removing the protective coating from the film after it has become abraded.

The cellulose ester or ether phthalate anti-abrasive layer is applied to the film in the form of a dilute solution followed by the subsequent removal of the carrier. The following methods show how dilute solutions may be evenly and smoothly applied to either side of photographic film, cellulose acetate phthalate being referred to as a specific example:

A. By bead application

Figure 1 shows the method employed when the cellulose acetate phthalate is applied from dilute solution by means of a liquid bead. Film 10 is drawn from stock roll 11 around idle roll 12 and onto a heated, driven drum 13. At the bottom of drum 13 is located an applicator roll 14 revolving in a hopper 15 containing the solution of cellulose acetate phthalate. The roll 14 is not in contact with the film on drum 13 but the solution is applied by a liquid bead which is formed between the two rolls by bringing roll 14 momentarily in contact with the film on drum 13 and then withdrawing it to such a distance that a liquid bead is maintained between the two rolls. The relative speeds of drum 13 and applicator roll 14 are adjusted so as to maintain a continuous bead once it has been formed. In case of a solution such as described in Example 1, these speeds were adjusted so as to give a peripheral speed for drum 13 of 28 feet per minute and drum 14 of 11 feet per minute. The coated photographic film receives part of its curing by means of heat supplied internally to drum 13 and is further cured by passing through a drying cabinet 16 maintained at approximately 130° F. From drying cabinet 16 the film is wound on roll 17. The entire procedure is repeated in order to coat the reverse side of the film, or a subsequent application may be made in the same run to coat the opposite side of the film. The speed of coating may vary within wide limits. The upper limit is governed by speed at which a satisfactory liquid bead may be maintained; that is to say, eventually a speed will be reached in which bubbles will form in the liquid bead and the vibration of the rapidly moving rolls will form liquid patterns on the applicator roll which will be transferred to the film. Satisfactory coatings have been obtained from 5 feet per minute to 30 feet per minute, which was the limit of the machine and not necessarily the upper limit coating speed. It is predicted that about 50 feet per minute would be a safe upper limit. The temperature of drum 13 may vary within wide limits depending upon the amount of curing necessary on the drum. It is found that some solutions will give rise to a translucent coating referred to as "blush" unless the curing be done largely on the heated drum. In this case the temperature of the drum can be maintained as high as 130–140° F. Likewise the speed may be lowered so that sufficient curing is attained on the drum or the film may be made to travel further around the heated drum after coating, i. e., the film may enter the drum just prior to the point of application and leave it just prior to the entrance point.

B. By applicator roll

In Fig. 2, film 10 is drawn from stock roll 11 under idle roll 18 and over applicator roll 19, which is wet with the liquid in hopper 15. The film then passes under idle roll 20 and the solvents are then removed by evaporation in drying cabinet 24. This method is more simple than the bead application method since all rolls are free running, the film being moved by the wind-up mechanism driving roll 17. Care must be taken, however, to select solvents for the cellulose acetate phthalate which will dry to a smooth, glossy coat in a drying cabinet. It should be noted that when rapid drying solvents are applied to film and the film passed through a cabinet in which there is rapid air circulation, the high evaporation rate of the solvents may cool the film to below room temperature even though heated air is used. This will often give rise to "blush" and other imperfections if improper solvents are used. At high rates of speed it may be necessary to remove excess liquid from roll 19 by means of a "doctor blade" or other means before the roll comes in contact with the film, otherwise liquid may carry through and form an uneven bead at the point where the film leaves the applicator roll.

C. By wick

In the foregoing methods of application on perforated 35 mm. motion picture film, only the area between the perforations can be coated. This is due to the fact that in the case of a bead or applicator roll the excess liquid would run through the perforations and produce a smear on the opposite side of the film. In the case of the wick application described in Figure 3 the entire area of perforated motion picture film may be smoothly and evenly coated at any desired rate of speed. Film 10 is drawn from stock roll 11 under two rolls, 22 and 23, which are placed so as to cause the film to impinge on a wick 24 wrapped around a stationary rod 25. The ends of the wick dip into the solution in hopper 15 and feed the solution to the moving film 10. Since there is very little excess liquid at the point of application, wetting through the perforations is avoided. The film is dried in the usual manner, in drying cabinet 26 and passes to the take-up roll 17. The speed of coating in this case is limited only by the thickness of the coat desired. At very rapid speeds the thickness of the coat will be decreased due to the inability of the wick to transfer the liquid as rapidly as it has been removed.

D. By immersion

In the foregoing methods only one side of the photographic film is coated at a time, whereas if the film is immersed in the coating liquid and the excess removed by some suitable means, the cellulose acetate phthalate layer can be applied to both sides of the photographic film at the same time. In Figure 4, film 10 is drawn from stock roll 11 over roll 27 and around roll 28 which is immersed in the coating liquid, in hopper 15. The film now passes through two air squeegees 29 which remove the excess liquid from the surface of the film as well as freeing the perforations from entrapped liquid. The film must then pass vertically through a long drying cabinet 30 so that the coat is entirely dry before the film touches the rollers 31 and 32, and take-up roll 17.

Cellulose acetate phthalate, for example that made according to the method described in United States Patent 2,126,460 to Leo B. Genung, is a suitable material for the operation of this invention. We prefer to use a cellulose acetate phthalate of about 23% acetyl content and about 25% phthalyl content, although cellulose acetate phthalate of 20% acetyl content and 38% phthalyl content to 32% acetyl content and 10% phthalyl content may be used. It is desired that the free phthalic acid content be below about 2% since otherwise the emulsion layer of the photographic film is sometimes stained brown.

I also prefer to use a cellulose acetate phthalate of low viscosity so that readily flowable solutions of high concentration may be obtained. I have found that cellulose acetate phthalate, the viscosity of whose 10% solution at 25° C. in 55% ethyl alcohol and 45% acetone is 4 centipoises is suitable, although cellulose acetate phthalates whose viscosities are from 2 centipoises to 90 centipoises or higher can be used.

Cellulose acetate phthalate is soluble in acetone, in acetone-methyl alcohol mixtures, in acetone-ethyl alcohol mixtures, in simple esters such as methyl acetate, ethyl acetate, ethyl lactate, in chlorinated hydrocarbon-alcohol mixtures such as ethylene dichloride-methanol or propylene dichloride-methanol mixtures, in hydrocarbon-alcohol mixtures such as benzene-methanol, toluene-methanol mixtures, in ethers such as dioxane, β-methoxy ethyl alcohol and β-ethoxy ethyl alcohol, ethylene glycol monoacetate, etc. However, few of these solvents or solvent combinations can be successfully used as such, especially on the support side where the extent of penetration must be carefully controlled if the coat is to be easily removed in subsequent operation. Therefore, solvents or solvent combinations must be used on the support side which have only a slight solvent action on the support. In order to determine what solutions are applicable for this invention, a strip of film is partly immersed in the solution and allowed to dry in a warm dry atmosphere. It is necessary that the lacquer form a coherent glossy coat without producing distortion of the film, i. e., excessive curl, brittleness, edge waviness, etc. In order to determine whether or not the coating is easily removable, the strip is then suspended in 1% sodium carbonate for two minutes, gently swabbed with cotton, rinsed and allowed to dry. If the coating has been substantially or completely removed, the solvent combination is useful.

The following table gives usable combinations for the support side of photographic film:

Table I

| | Solvent | Removability |
|---|---|---|
| | | Percent |
| 1 | Methyl alcohol, 95%. Water, 5% | 100 |
| 2 | Methyl alcohol, 90%. Water, 10% | 100 |
| 3 | Methyl alcohol, 80%. Water, 20% | 100 |
| 4 | n-Prophyl alcohol, 72%. Water, 28% | 90 |
| 5 | Methyl alcohol, 40%. Benzene, 60% | 100 |
| 6 | n-Propyl alcohol, 54%. Tetrachloroethane, 46% | 75 |
| 7 | n-Propyl alcohol, 90%. Acetone, 5%. Water, 5% | 100 |
| 8 | n-Propyl alcohol, 81%. Acetone, 14%. Water, 5% | 100 |
| 9 | Isopropyl alcohol, 90%. Acetone, 5%. Water, 5% | 100 |
| 10 | Isopropyl alcohol, 81%. Acetone, 14%. Water, 5% | 100 |
| 11 | Ethyl alcohol, 80%. Acetone, 15%. Water, 5% | 100 |
| 12 | Ethyl alcohol, 70%. Acetone, 15%. Water, 15% | 100 |
| 13 | Ethyl alcohol, 56%. Isopropyl alcohol, 19%. Water, 15%. Igepal C (a higher fatty acid ether of hexahydroxyethoxysorbitol), 10% | 85 |
| 14 | Ethyl alcoholic, 56%. Isopropyl alcohol, 19%. Water, 15%. n-Butyl alcohol, 10% | 100 |
| 15 | Ethyl alcohol, 56%. Isopropyl alcohol, 19%. Water, 15%. Sec. butyl alcohol, 10% | 95 |
| 16 | Ethyl alcohol, 56%. Isopropyl alcohol, 19%. Water, 15%. Tert.-butyl alcohol, 10% | 100 |
| 17 | Ethyl alcohol, 56%. Isopropyl alcohol, 19%. Water, 15%. Butyl cellosolve, 10% | 100 |
| 18 | Ethyl acetate, 15%. Ethyl cellosolve, 15%. Ethyl alcohol, 15%. Butyl alcohol, 10%. Toluene, 45% | 100 |

It is frequently necessary to maintain the solutions at a slightly elevated temperature, i. e., about 40° C., to prevent slight precipitation.

In the case of the coating of cellulose acetate phthalate on the emulsion side of photographic film practically all of the above solutions are usable as well as many other containing more active solvents. As there is no difficulty of removal on the emulsion side, the only question is one of satisfactory appearance, proper wetting, etc. Substances such as methyl or ethyl cellosolve retard the drying and give a smoother coat. It is often advisable to add surface active materials such as alkylated naphthalene sulfonic acids or their salts to cause the solution to wet the emulsion side evenly.

The following examples, which are illustrative only, indicate several methods of applying an anti-abrasion coating to photographic film according to my invention.

*Example 1*

A roll of 35 mm. motion-picture positive cellulose nitrate film was coated on the support side with a removable lacquer of the following composition:

| | Grams |
|---|---|
| Cellulose acetate phthalate | 20 |
| Methyl alcohol | 180 |
| Distilled water | 20 |

The viscosity of this solution in centipoises was 1.4. The emulsion side was coated in the manner described in Example 2. This roll of motion-picture film was given normal theatre projection and it was found that the roll showed normal wear throughout with many longitudinal scratches on both sides, many of which were visible on the screen upon projection. (The untreated portion of the roll showed the same wear as the treated portion.)

The cellulose acetate phthalate scratch protective coating was then removed by passing the film through a solution of 1% sodium carbonate in the manner shown in Figure 5. Coated film 33 is drawn from stock roll 34 into tank 35 which contains 1% sodium carbonate solution. The speed of the film and the capacity of the tank are adjusted so that the film remains in the carbonate solution about 2 minutes. The film then passes into rinse water in tank 36. The rubber squeegee 37 may be used between tanks 35 and 36 to insure the complete removal of the coat. The film then passes into a hardening solution in tank 38 which serves to set the soft gelatine. The film is finally washed in tank 39, dried in hot air cabinet 40 and wound on roll 41.

The film on examination was found to be free from scratches or defects of any kind. A fresh coating of cellulose acetate phthalate was then applied to both sides of the film and the process repeated. In this way it has been established that this coating offers complete and permanent protection against scratches on photographic film.

In the above example, the methyl alcohol-water mixture illustrates the use of non-solvents to restrict the penetration of the coating into the support and at the same time aid in the solution of the cellulose acetate phthalate. Mixtures of methyl alcohol-water from 95% methyl alcohol-5% water to 80% methyl alcohol-20% water are usable, but 90% methyl alcohol-10% water is preferred.

*Example 2*

The emulsion side of the roll of motion picture film referred to in Example 1 was coated with a solution as follows:

| | Grams |
|---|---|
| Cellulose acetate phthalate | 160 |
| Ethyl alcohol (95%) | 1400 |
| Isopropyl alcohol | 476 |
| Methyl cellosolve | 380 |
| Water | 374 |

This was coated by "bead" application as shown in Figure 1 at 28 feet per minute, and curing was accomplished on a drum at 110° F. and in a drying cabinet with 150° F. inlet temperature and 130° F. outlet.

It should be pointed out that the above formula is compounded to give the proper viscosity, wetting, and rate of drying under certain predetermined conditions of application. For other conditions of application there are many other solvents and solvent combinations. For instance, acetone alone may be used, or acetone with various amounts of the simple aliphatic alcohols. Likewise, acetone may be used with esters such as methyl and ethyl acetate, ethyl lactate, etc. The simple aliphatic alcohols alone do not give good solutions of cellulose acetate phthalate, but are satisfactory in conjunction with water, methyl cellosolve, etc.

*Example 3*

A roll of 35 mm. motion picture film was coated on both sides with a solution of cellulose acetate phthalate to which a wetting agent was added to produce a more uniform wetting of the emulsion surface. The solution was as follows:

| | Grams |
|---|---|
| Cellulose acetate phthalate | 6 |
| Ethyl alcohol | 70 |
| Methyl cellosolve | 10 |
| Water | 10 |
| Acetone | 10 |
| Aerosol OT (dioctyl sodium sulfosuccinate) | .3 |

*Example 4*

Cellulose acetate phthalate was applied to the emulsion side of 35 mm. motion picture film as described in Example 2 except that .1 gm. of Igepon T (oleyl tauride sodium salt) was added to 100 cc. of the coating mixture. This addition of wetting agent causes the liquid to wet the surface of the applicator roll more evenly and thus a more uniform bead is produced which in turn gives a coating of better appearance.

*Example 5*

Processed 35 mm. Kodachrome Safety color film was coated on both sides with a solution of cellulose acetate phthalate made as follows:

| | Grams |
|---|---|
| Cellulose acetate phthalate | 320.5 |
| Ethyl alcohol | 2800 |
| Isopropyl alcohol | 952 |
| Methyl cellosolve (ethylene glycol monomethylether) | 760 |
| Water | 750 |
| Igepon T (oleyl tauride sodium salt) | .5 |

Satisfactory coatings have been made on the bead type of machine as shown in Figure 1 and also on the applicator roll machine as shown in Figure 2.

In the case of Kodachrome, the cellulose acetate phthalate coating is especially useful in preventing fingerprinting of the emulsion as well as to prevent abrasion. When unprotected in this manner, fingerprints cannot be removed from Kodachrome emulsion without damage to the film. Fingerprints are objectional because they show clearly on the screen upon projection.

*Example 6*

35 mm. cellulose nitrate motion picture film which had as an anti-halation layer a coating of cellulose acetate on the support side, was coated on the support side with a solution of cellulose acetate phthalate as described in Example 1 and on the emulsion side as described in Example 2.

*Example 7*

35 mm. cellulose nitrate motion picture film was coated on both emulsion and support sides with cellulose acetate phthalate having a phthalyl content of 10.3% from a solution consisting of:

| | Grams |
|---|---|
| Cellulose acetate phthalate (10.3% phthalyl content) | 4.0 |
| Dioxane | 25.6 |
| Methyl alcohol | 43.5 |
| Isopropyl alcohol | 7.9 |
| Water | 10.0 |

*Example 8*

The above solution was applied in exactly the same way to 35 mm. nitrate motion picture film which has as an anti-static backing on the support side a thin layer of cellulose acetate.

*Example 9*

35 mm. cellulose nitrate motion picture film was coated on both emulsion and support sides with cellulose acetate phthalate having a phthalyl content of 37.4% from a solution consisting of:

| | Grams |
|---|---|
| Cellulose acetate phthalate (37.4% phthalyl content) | 5.0 |
| Dioxane | 15.4 |
| Methyl alcohol | 51.4 |
| Isopropyl alcohol | 7.9 |
| Water | 10.0 |

*Example 10*

The above solution was applied in exactly the same way to 35 mm. nitrate motion picture film which had as an anti-static backing on the support side a thin layer of cellulose acetate.

It is also possible to plasticize the coatings of cellulose acetate phthalate. Small additions of materials such as diethyl phthalate, triacetin, etc., help to prevent blushing and subsequent precipitation of the cellulose acetate phthalate. The use of larger amounts of plasticizers gives a coating of lower melting point and light scratches or abrasion marks may be removed by passing the coated scratched film over a smooth roll maintained at such a temperature that the cellulose acetate phthalate layer flows slightly and "heals" the scratches.

Cellulose acetate succinate, for example that made according to the method described in United States Patent 2,126,460 is also a suitable material for the operation of this invention. I prefer to use a cellulose acetate succinate of about 30% succinyl content although cellulose acetate succinates whose succinyl content is from 6% to 40% may be used.

Cellulose acetate succinate is soluble in acetone, dioxane, methyl cellosolve and acetic acid. It is soluble in mixtures of acetone and water containing as high as 40% water and mixtures of dioxane and water containing as high as 35% water, methyl cellosolve-water mixtures containing as high as 40% water. It is insoluble in water, methyl alcohol, ethyl alcohol, hydrocarbons and chlorinated hydrocarbons.

Example 11

35 mm. cellulose nitrate motion picture film was coated on both sides with cellulose acetate succinate from a solution consisting of:

| | Grams |
|---|---|
| Cellulose acetate succinate | 10 |
| Ethyl alcohol (95%) | 10 |
| Methyl cellosolve | 10 |
| Acetone | 10 |
| Water | 10 |

Cellulose acetate maleate, for example, that made according to the method described in United States Patent 2,126,460 is also a suitable material for the operation of this invention. I prefer to use a cellulose acetate maleate of about 18% maleyl content although cellulose acetate maleates whose maleyl contents are from about 10% to about 40% may be used.

Cellulose acetate maleate is soluble in acetone, dioxane, and methyl cellosolve. It is soluble in acetone-water mixtures containing as high as 40% water, in dioxane-water mixtures containing as high as 50% water, and in methyl cellosolve-water mixtures containing as high as 40% water. It is insoluble in water, aliphatic alcohols, hydrocarbons, chlorinated hydrocarbons and acetic acid.

Example 12

35 mm. cellulose acetate motion picture film was coated on both sides by bead application from a solution consisting of:

| | Grams |
|---|---|
| Cellulose acetate maleate | 5.0 |
| Acetone | 20.0 |
| Methyl alcohol | 47.5 |
| Isopropyl alcohol | 7.9 |
| Water | 15.0 |

Phthalates of mixed esters of cellulose may be used as coating materials for protecting the surface of photographic film from abrasion. For example, the phthalates of the mixed cellulose esters made according to the method described in Blanchard and Crane United States application, Serial No. 222,302, filed July 30, 1938, are suitable materials. A preferred form of these compounds is cellulose acetate propionate phthalate of about 26% phthalyl content, although acetate propionate phthalates whose phthalyl content is from about 10% to about 40% may be used.

Cellulose acetate propionate phthalate is soluble in dioxane, acetone, and in dioxane-water mixtures containing as high as 30% water, and in acetone-water mixtures containing as high as 25% water. It is soluble with difficulty in methyl cellosolve. It is insoluble in water, simple alcohols, hydrocarbons, acetic acid and chlorinated hydrocarbons.

Example 13

35 mm. nitrate motion picture film was coated on both emulsion and support sides with acetate propionate phthalate consisting of:

| | Grams |
|---|---|
| Acetate propionate phthalate | 5.0 |
| Dioxane | 20.6 |
| Methyl alcohol | 55.3 |
| Water | 10.0 |

I may also use the phthalates of cellulose ethers, such as methyl cellulose phthalate made according to the method described in United States Patent No. 2,126,460. I prefer to use an ethyl cellulose phthalate of about 25% phthalyl content, although ethyl cellulose phthalates whose phthalyl content is from about 10% to about 45% may be used.

Ethyl cellulose phthalate is soluble in acetone, dioxane, methyl cellosolve, simple alcohols such as methyl and ethyl alcohols, acetic acid, benzene, and in mixtures of dioxane and water containing as high as 35% water, in methyl cellosolve-water mixtures containing as high as 20% water, and in methyl alcohol-water mixtures containing as high as 15% water. It is insoluble in water and chlorinated hydrocarbons, such as carbon tetrachloride and tetrachloroethane.

Example 14

35 mm. nitrate motion picture film was coated on both emulsion and support sides with ethyl cellulose phthalate consisting of:

| | Grams |
|---|---|
| Ethyl cellulose phthalate | 5 |
| Acetone | 22 |
| Methyl cellosolve | 10 |
| Ethyl alcohol (95%) | 58 |
| Water | 10 |

The phthalates of cellulose esters and ethers are soluble in dilute alkalies and these materials are suitable, under certain conditions, as film protective coatings. For example, the soluble ammonium salt of cellulose acetate phthalate may be formed by dissolving cellulose acetate phthalate in dilute ammonium hydroxide. Soluble amine salts may also be made. These aqueous salt mixtures may be used directly as coatings or they may diluted with solvents, such as the simple aliphatic alcohols, acetone, cellosolve, etc. The solutions of these materials must have some affinity for the layers over which they are applied as otherwise the protective coating may peel. It is necessary, therefore, to use a certain amount of organic solvent in the case where these aqueous salts are applied to the support side of photographic film. Where they are applied to the emulsion side only the use of organic solvents is not necessary. In the case of the aqueous salt solutions diluted with alcohol, the water has an affinity for the emulsion side and the alcohol has a slight affinity for the support side sufficient to prevent peeling of the coating.

The following examples illustrate the application of salts of cellulose acetate phthalate to the emulsion and support sides of photographic film.

*Example 15*

55.5 grams cellulose acetate phthalate of 23% acetyl content and 25% phthalyl content containing less than 2% free phthalic acid and whose viscosity was 3.7 centipoises was added to 500 cc. distilled water. To this suspension was slowly added with stirring 25 cc. of ammonia (specific gravity=.90). The resulting solution was then filtered through a filtering medium to remove any dirt and insoluble particles. To 30 cc. of this solution was added a mixture of 15 cc. 95% ethyl alcohol and 5 cc. water. This solution is suitable for coating both the emulsion and the support side of photographic film by any of the above described processes.

*Example 16*

In a like manner a solution of triethylamine salt of cellulose acetate phthalate may be made using about 20 cc. triethylamine in place of the 25 cc. ammonium hydroxide in Example 15. The solution was filtered, diluted and coated onto both sides of 35 mm. photographic film as described in Example 15.

Films treated in the above manner show an increased resistance to abrasion which in itself is desirable. Furthermore, by adjusting the thickness of the layer applied to the surface of the film, the abrasion marks ordinarily encountered in the handling of motion picture film can be restricted to the removable layer and thus prevent any damage to the film itself. It naturally follows that on removal of the coat bearing the abrasion marks and its replacement by a fresh coat, the film is perfectly reconditioned.

On account of the affinity of the salts of cellulose acetate phthalate for water, these coats are somewhat subject to finger-printing. This difficulty can be minimized by thorough curing of rolls or strips of coated film at an elevated temperature, i. e., several hours at 50–70° C.

The removable coatings of the cellulose ester or cellulose ether phthalates described above may be used in conjunction with additional coatings of materials which are not in themselves soluble in dilute alkalies but which give protection against scratching and finger-printing. For example, the cellulose acetate phthalate salts which give protection against abrasion but which are to some extent subject to finger-printing can be coated with a layer of material which is impervious to fingerprinting. In this way any materials of very low moisture susceptibiltiy can be used, which if applied directly to film would not offer the abrasion protection contemplated by the present invention since they could not be removed. Materials such as synthetic resins may in this manner be coated over the layers of the phthalates of the cellulose esters or ethers to afford complete protection.

It is to be noted that the anti-abrasion coating, according to my invention, is applied, not to a sensitive photographic film, but to a finished film, that is, one which has been developed, fixed, washed, and dried. It has previously been proposed to coat sensitive photographic films with cellulose acetate phthalate. These layers, however, were not used as anti-abrasion layers for finished film, and were not removable and renewable to prevent permanent abrasion marks on the film. It was not hitherto supposed that a soluble material, such as cellulose acetate phthalate, would be satisfactory for coating finished photographic film which must withstand a large number of passages through the projection machines, and would be removable and renewable.

My invention is susceptible of numerous modifications, not specifically mentioned in the present description, for example, film base other than that composed of cellulose nitrate may be coated according to my invention, such as cellulose acetate, cellulose acetate propionate, and other cellulose organic acid ester film supports, or supports of synthetic resins. The coating material may consist of any cellulose mixed ester or ether-ester which contains a dicarboxylic acid radical, the carboxyl groups of which are linked by intervening carbon atoms and one of the carboxyl groups of which is joined to the cellulose. These compounds include cellulose esters such as cellulose acetate phthalate, cellulose acetate propionate phthalate, cellulose acetate succinate or cellulose acetate maleate, or cellulose ether-esters, such as methyl cellulose phthalate and ethyl cellulose phthalate, or the water-soluble salts of either of these classes of compounds. My invention is to be taken as limited only by the scope of the appended claims.

What I claim is:

1. A photographic film containing a visible image and free from permanent abrasion comprising a developed, fixed, washed, and dried photographic film having thereon a coating of cellulose acetate phthalate of from 20% to 32% acetyl content and from 38% to 10% phthalyl content, which is removable in a 1% sodium carbonate solution.

2. A photographic film containing a visible image and free from permanent abrasion comprising a developed, fixed, washed, and dried photographic film having thereon a coating of cellulose acetate phthalate of approximately 23% acetyl content and approximately 25% phthalyl content, which is removable in a 1% sodium carbonate solution.

3. A photographic film containing a multi-color image in an emulsion layer and free from abrasion and finger-marking, comprising a cellulosic support having thereon a plurality of emulsion layers containing a multi-color photographic image, an emulsion layer being coated with cellulose acetate phthalate of approximately 23% acetyl content and approximately 25% phthalyl content.

RALPH H. TALBOT.